US012756019B2

(12) United States Patent
Suyama et al.

(10) Patent No.: US 12,756,019 B2
(45) Date of Patent: Oct. 6, 2026

(54) AQUEOUS BATTERY

(71) Applicant: TOYOTA JIDOSHA KABUSHIKI KAISHA, Toyota (JP)

(72) Inventors: Hiroshi Suyama, Mishima (JP); Hidenori Miki, Hiratsuka (JP); Shigeki Sato, Fujinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 498 days.

(21) Appl. No.: 18/537,891

(22) Filed: Dec. 13, 2023

(65) Prior Publication Data

US 2024/0213546 A1 Jun. 27, 2024

(30) Foreign Application Priority Data

Dec. 21, 2022 (JP) ................................ 2022-204583

(51) Int. Cl.
*H01M 10/36* (2010.01)
*H01M 4/02* (2006.01)
*H01M 4/48* (2010.01)

(52) U.S. Cl.
CPC ............. *H01M 10/36* (2013.01); *H01M 4/48* (2013.01); *H01M 2004/021* (2013.01); *H01M 2004/027* (2013.01); *H01M 2300/0008* (2013.01)

(58) Field of Classification Search
CPC ............................................ H01M 2300/0002
See application file for complete search history.

(56) References Cited

U.S. PATENT DOCUMENTS

| | | | | |
|---|---|---|---|---|
| 2011/0221302 | A1* | 9/2011 | Yabuta | H10N 30/097 310/311 |
| 2019/0386346 | A1* | 12/2019 | Suyama | H01M 4/661 |
| 2021/0159482 | A1* | 5/2021 | Suyama | H01M 4/244 |

FOREIGN PATENT DOCUMENTS

| | | | | |
|---|---|---|---|---|
| JP | 2014110240 A * | 6/2014 | | |
| JP | 2019-220294 A | 12/2019 | | |
| WO | WO-0079622 A1 * | 12/2000 | | H01M 6/045 |

* cited by examiner

*Primary Examiner* — Frank J Vineis
*Assistant Examiner* — Vivian Cheng
(74) *Attorney, Agent, or Firm* — Oliff PLC

(57) ABSTRACT

Disclosed are a novel inorganic compound capable of functioning as a negative electrode active material of an aqueous battery, and an aqueous battery using the same. The aqueous battery of the present disclosure comprises a positive electrode, an aqueous electrolyte solution and a negative electrode, the aqueous electrolyte solution contains water and alkali metal ions or zinc ions, the negative electrode contains an inorganic compound as a negative electrode active material, and the inorganic compound has a crystal structure belonging to a space group I23.

13 Claims, 5 Drawing Sheets

Example 3

Example 4

AQUEOUS BATTERY

TECHNICAL FIELD

The present application discloses an aqueous battery including an aqueous electrolyte solution.

BACKGROUND ART

Various aqueous batteries such as aqueous potassium ion batteries and aqueous zinc ion batteries are known. Aqueous batteries include an aqueous electrolyte solution (e.g., PTL 1). Organic compounds such as Prussian blue and perylene are known as active materials for aqueous batteries. For example, perylene derivatives have been studied as negative electrode active materials for aqueous potassium ion batteries, but it is currently lacking in practicality.

CITATION LIST

Patent Literature

[PTL 1] JP 2019-220294 A

SUMMARY

Technical Problem

Active materials composed of organic compounds have a large space in the lattice, which is disadvantageous from the viewpoint of the energy density or the like. In this regard, there is a need for novel active materials which can be used in various aqueous batteries and are composed of inorganic compounds.

Solution to Problem

The present application discloses, as aforementioned solution to problem, the following plurality of aspects.

Aspect 1

An aqueous battery comprising a positive electrode, an aqueous electrolyte solution and a negative electrode, wherein the aqueous electrolyte solution contains water and alkali metal ions or zinc ions, the negative electrode contains an inorganic compound as a negative electrode active material, and the inorganic compound has a crystal structure belonging to a space group I23.

Aspect 2

The aqueous battery according to aspect 1, wherein the inorganic compound contains element A, element M and O, the element A is at least one of Bi and La, and the element M is at least one of Bi, Mn, Fe, Co, Ti and Ni.

Aspect 3

The aqueous battery according to aspect 2, wherein the element A is Bi.

Aspect 4

The aqueous battery according to aspect 2 or 3, wherein the element M is at least one of Mn, Fe, Co and Ni.

Aspect 5

The aqueous battery according to any one of aspects 2 to 4, wherein the element A is Bi, and the element M is at least one of Mn, Fe and Ni.

Aspect 6

The aqueous battery according to any one of aspects 1 to 5, wherein the aqueous electrolyte solution contains water and alkali metal ions.

Aspect 7

The aqueous battery according to any one of aspects 1 to 6, wherein the aqueous electrolyte solution contains water and potassium ions.

Aspect 8

The aqueous battery according to any one of aspects 1 to 7, wherein the aqueous electrolyte solution contains water and potassium pyrophosphate dissolved in the water.

Aspect 9

The aqueous battery according to any one of aspects 1 to 8, wherein the aqueous electrolyte solution contains water and potassium ions, a molar ratio of water to potassium ions ($H_2O/K$) is 3.5 or less, and the aqueous electrolyte solution contains potassium pyrophosphate dissolved in the water.

Aspect 10

The aqueous battery according to any one of aspects 1 to 9, wherein the aqueous electrolyte solution has a pH of 3 or more and 13 or less.

Aspect 11

The aqueous battery according to any one of aspects 1 to 10, wherein the aqueous electrolyte solution has no freezing point at −60° C. or higher.

Aspect 12

The aqueous battery according to any one of aspects 1 to 11, wherein the aqueous electrolyte solution is not accompanied by salt precipitation when cooled from 0° ° C. to −60° C.

Aspect 13

The aqueous battery according to any one of aspects 1 to 12, wherein the aqueous electrolyte solution has a viscosity of 10 mPa·s or more and 350 mPa·s or less at 20° C.

Effects

The inorganic compounds of the present disclosure can be used as negative electrode active materials in various aqueous batteries such as aqueous alkali metal ion batteries and aqueous zinc ion batteries. When the inorganic compounds of the present disclosure are employed as the negative electrode active materials of aqueous batteries, the energy density of the aqueous batteries can be easily improved compared to the case where organic compounds are employed.

DESCRIPTION OF EMBODIMENTS

1. Aqueous Battery

Figure 1:
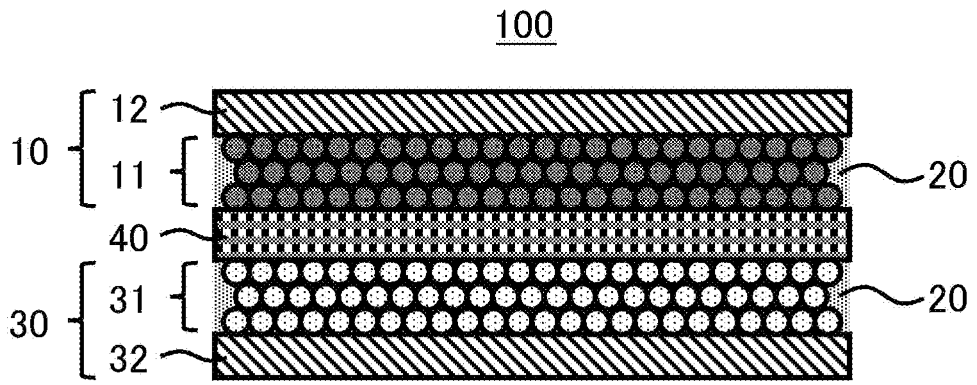
FIG. 1 schematically shows one example of a configuration of an aqueous battery.

The aqueous battery according to the embodiment will be described below with reference to the accompanying drawings, but the technology of the present disclosure is not limited to the following embodiment. FIG. 1 schematically shows a configuration of an aqueous battery 100 according to the embodiment. As shown in FIG. 1, the aqueous battery 100 includes a positive electrode 10, an aqueous electrolyte solution 20 and a negative electrode 30. The aqueous electrolyte solution 20 contains water and alkali metal ions or zinc ions. The negative electrode 30 contains an inorganic compound as a negative electrode active material. The inorganic compound has a crystal structure belonging to a space group I23.

1.1 Positive Electrode

It is possible to employ, as the positive electrode 10, any known positive electrode for aqueous batteries. As shown in FIG. 1, the positive electrode 10 can include a positive electrode active material layer 11 and a positive electrode current collector 12.

1.1.1 Positive Electrode Active Material Layer

The positive electrode active material layer 11 contains a positive electrode active material. The positive electrode active material layer 11 can be impregnated with the aqueous electrolyte solution 20. The positive electrode active material layer 11 may contain, in addition to the positive electrode active material, a conductivity aid, a binder and various additives. The content of each component in the positive electrode active material layer 11 may be appropriately determined according to the desired battery performance. For example, the content of the positive electrode active material may be 40% by mass or more, 50% by mass or more, 60% by mass or more, or 70% by mass or more, and may be 100% by mass or less, or 90% by mass or less, based on 100% by mass of the entire positive electrode active material layer 11 (total solid content). The shape of the positive electrode active material layer 11 is not particularly limited, and the positive electrode active material layer may be, for example, a sheet-shaped positive electrode active material layer with almost flat surface. The thickness of the positive electrode active material layer 11 is not particularly limited, and may be, for example, 0.1 μm or more, 1 μm or more, or 10 μm or more, and may be 2 mm or less, 1 mm or less, or 500 μm or less.

It is possible to employ, as the positive electrode active material, any material which can function as a positive electrode active material of an aqueous battery. The charge-discharge potential of the positive electrode active material is higher than that of the negative electrode active material mentioned below. The type of the positive electrode active material can be selected in consideration of the type of carrier ions and the potential window of the aqueous electrolyte solution 20. The positive electrode active material may be either those which insert or de-insert carrier ions by intercalation, or those which insert or de-insert carrier ions by a conversion reaction, an alloying reaction or the like. The positive electrode active material may be used alone, or two or more thereof may be used in combination.

When potassium ions are employed as carrier ions, the positive electrode active material may contain K element. Specific examples thereof include oxides and polyanions containing K element. More specifically, the positive electrode active material may be a composite oxide of potassium and transition metal. The composite oxide may be at least one selected from potassium cobalt composite oxide ($KCoO_2$, etc.), potassium nickel composite oxide ($KNiO_2$, etc.), potassium nickel titanium composite oxide ($KNi_{1/2}Ti_{1/2}O_2$, etc.), potassium nickel manganese composite oxide ($KNi_{1/2}Mn_{1/2}O_2$, $KNi_{1/3}Mn_{2/3}O_2$, etc.), potassium manganese composite oxide ($KMnO_2$, $KMn_2O_4$, etc.), potassium iron manganese composite oxide ($K_{2/3}Fe_{1/3}Mn_{2/3}O_2$, etc.), potassium nickel cobalt manganese composite oxide ($KNi_{1/3}CO_{1/3}Mn_{1/3}O_2$, etc.), potassium iron composite oxide ($KFeO_2$, etc.), potassium chromium composite oxide ($KCrO_2$, etc.), potassium iron phosphate compound ($KFePO_4$, etc.), potassium manganese phosphate compound ($KMnPO_4$, etc.) and potassium cobalt phosphate compound ($KCoPO_4$). Even if the K site in the composite oxide is composed of other alkali metal elements, it may be possible to insert or de-insert K ions by ion exchange or the like. Alternatively, the positive electrode active material may be an organic active material such as Prussian blue. As mentioned below, in the aqueous battery 100 of the present disclosure, even when an organic compound is employed as the positive electrode active material, the energy density can be improved by employing an inorganic compound as the negative electrode active material. Alternatively, the positive electrode active material may be at least one selected from potassium titanate, $TiO_2$, sulfur (S), etc., in which a charge-discharge potential is a high potential compared to the negative electrode active material mentioned below.

When lithium ions are employed as carrier ions, it is possible to employ, as the positive electrode active material, any known positive electrode active material for lithium ion batteries. The positive electrode active material for lithium ion batteries may be either an organic or inorganic material. The positive electrode active material for lithium ion batteries may be, for example, at least one selected from various lithium-containing compounds, elemental sulfur and sulfur compounds and the like. The lithium-containing compound as the positive electrode active material may be a lithium-containing oxide containing at least one element M', Li and O. The element M' may be, for example, at least one selected from Mn, Ni, Co, Al, Mg, Ca, Sc, V, Cr, Cu, Zn, Ga, Ge, Y, Zr, Sn, Sb, W, Pb, Bi, Fe and Ti, and may be at least one selected from the group consisting of Mn, Ni, Co, Al, Fe and Ti. More specifically, the lithium-containing oxide may be at least one selected from lithium cobaltate, lithium nickelate, lithium manganate, lithium nickel cobaltate, lithium nickel manganate, lithium cobalt manganate, lithium nickel cobalt manganate ($Li_{1\pm\alpha}Ni_xCo_yMn_zO_{2\pm\delta}$ (e.g., $0<x<1$, $0<y<1$, $0<z<1$, $x+y+z=1$)), spinel-based lithium compounds (different element-substituted Li—Mn spinel with the composition represented by $Li_{1+x}Mn_{2-x-y}M_yO_4$ (M is one or more selected from Al, Mg, Co, Fe, Ni and Zn), etc.), lithium nickel cobalt aluminate (e.g., $Li_{1\pm\alpha}Ni_pCo_qAl_rO_{2\pm\delta}$ (e.g., $p+q+r=1$)), lithium titanate and lithium metal phosphate ($LiMPO_4$, etc., where M is one or more selected from Fe, Mn, Co and Ni).

When sodium ions are employed as carrier ions, it is possible to employ, as the positive electrode active material, any known positive electrode active material for sodium ion batteries. The positive electrode active material for sodium ion batteries may be either an organic or inorganic material. For example, the positive electrode active material for sodium ion batteries may be at least one selected from various sodium-containing compounds, elemental sulfur and sulfur compounds and the like. The sodium-containing compound as the positive electrode active material may be a sodium-containing oxide containing at least one element M', Na and O. The element M' may be, for example, at least one selected from Mn, Ni, Co, Al, Mg, Ca, Sc, V, Cr, Cu, Zn, Ga, Ge, Y, Zr, Sn, Sb, W, Pb, Bi, Fe and Ti, and may be at least one selected from the group consisting of Mn, Ni, Co, Al, Fe and Ti. For example, it may be those with a chemical composition such that Li of the lithium-containing oxide is replaced by Na (however, the crystal structure can be changed by replacing Li by Na).

When zinc ions are employed as carrier ions, it is possible to employ, as the positive electrode active material, materials capable of inserting or de-inserting zinc ions. Such material may be, for example, at least one selected from various inorganic composite oxides (e.g., vanadium-containing oxides such as $V_2O_5$-based oxides, manganese-containing oxides such as $MnO_2$-based oxides, spinel-type oxides such as $ZnMn_2O_4$, or composite oxides of alkali metal and transition metal disclosed in JP 2020-27703 A, etc.) and organic materials (e.g., fullerene disclosed in JP 2020-30997 A, compounds having a pentacene skeleton and compounds having a rubrene skeleton disclosed in JP 2020-43029 A, etc.).

The shape of the positive electrode active material may be any shape which can function as the positive electrode active material of the battery. The positive electrode active material may be, for example, particulate. The positive electrode active material may be either solid or hollow, and may have voids or may be porous. The positive electrode active material may be either a primary particle or a secondary particle in which a plurality of primary particles are agglomerated. The mean particle diameter D50 of the positive electrode active material may be, for example, 1 nm or more, 5 nm or more, or 10 nm or more, and may be 500 μm or less, 100 μm or less, 50 μm or less, or 30 μm or less. The mean particle diameter D50 in the present application is a particle diameter (median diameter) at a cumulative value of 50% in a particle size distribution in terms of volume by a laser diffraction scattering method.

Examples of the conductive aid which can be contained in the positive electrode active material layer 11 include carbon materials such as vapor-phase-grown carbon fiber (VGCF), acetylene black (AB), Ketjen black (KB), carbon nanotube (CNT) and carbon nanofiber (CNF); and metallic materials which are insoluble in an electrolyte solution, including nickel, titanium, aluminum, stainless steel and the like. The conductive aid may be, for example, particulate or fibrous, and its size is not particularly limited. The conductive aid may be used alone, or two or more thereof may be used in combination.

Examples of the binder which can be contained in the positive electrode active material layer 11 include butadiene rubber (BR)-based binders, butylene rubber (IIR)-based binders, acrylate-butadiene rubber (ABR)-based binders, styrene-butadiene-based rubber (SBR) binders, polyvinylidene fluoride (PVdF)-based binders, polytetrafluoroethylene (PTFE)-based binders, polyimide (PI)-based binders and the like. The binder may be used alone, or a two or more thereof may be used in combination.

1.1.2 Positive Electrode Current Collector

As shown in FIG. 1, the positive electrode 10 can include a positive electrode current collector 12 which is in contact with the positive electrode active material layer 11. The positive electrode current collector 12 may be in contact with the aqueous electrolyte solution 20. It is possible to employ, as the positive electrode current collector 12, any material which can function as a positive electrode current collector of an aqueous battery. The positive electrode current collector 12 may be in the form of foil, plate, mesh or perforated metal, and foamed body. The positive electrode current collector 12 may be composed of a metal foil or metal mesh. In particular, the metal foil is excellent in handleability or the like. The positive electrode current collector 12 may be composed of a plurality of foils. Examples of the metallic material constituting the positive electrode current collector 12 include those containing at least one element selected from the group consisting of Cu, Ni, Al, V, Au, Pt, Mg, Fe, Ti, Pb, Co, Cr, Zn, Ge, In, Sn and Zr. The positive electrode current collector 12 may be a metal foil or base material on which the above metals are plated or vapor-deposited. When the positive electrode current collector 12 is composed of a plurality of metal foils, it may have some layer between the plurality of metal foils. The thickness of the positive electrode current collector 12 is not particularly limited. For example, the thickness may be 0.1 μm or more, or 1 μm or more, and may be 1 mm or less, or 100 μm or less.

1.2 Aqueous Electrolyte Solution

The aqueous electrolyte solution 20 contains water and alkali metal ions or zinc ions. The alkali metal ions and zinc ions function as carrier ions in the aqueous battery 100, respectively. The aqueous electrolyte solution 20 may be in contact with the positive electrode current collector 12 mentioned above and may be contained in positive electrode active material layer 11 mentioned above, and may be in contact with the negative electrode current collector 32 mentioned below and may be contained in the negative electrode active material layer 31 mentioned below, and may be held by a separator 40 between the positive electrode 10 and the negative electrode 30.

1.2.1 Solvent

The aqueous electrolyte solution 20 contains water as a solvent. The solvent contains water as a main component. That is, water accounts for between 50 mol % or more and 100 mol % or less based on the total amount of the solvent constituting the aqueous electrolyte solution (100 mol %).

Water may account for 70 mol % or more, 90 mol % or more, or 95 mol % or more, based on the total amount of the solvent. Meanwhile, the upper limit of the proportion of water in the solvent is not particularly limited. The solvent may be composed only of water (100 mol % of water).

From the viewpoint of forming a solid electrolyte interphase (SEI) on the surface of the active material, the aqueous electrolyte solution 20 may contain, in addition to water, solvents other than water. Examples of the solvent other than water include one or more organic solvents selected from ethers, carbonates, nitriles, alcohols, ketones, amines, amides, sulfur compounds and hydrocarbons. The solvent other than water may account for 50 mol % or less, 30 mol % or less, 10 mol % or less, or 5 mol % or less, of the total amount of the solvent constituting the aqueous electrolyte solution 20 (100 mol %).

1.2.2 Electrolyte

An electrolyte can be dissolved in the aqueous electrolyte solution 20. The electrolyte can dissociate into cations and anions in the aqueous electrolyte solution 20. In the aqueous electrolyte solution 20, cations may be completely dissociated from anions or may form an aggregate in close proximity to anions. According to the present inventors' finding, when the aqueous electrolyte solution 20 contains water and alkali metal ions, especially when it contains water and potassium ions, the capacity of the aqueous battery 100 is more likely to increase.

The aqueous electrolyte solution 20 may contain a plurality of cations. For example, when the aqueous electrolyte solution 20 contains potassium ions as carrier ions, other cations may be contained together with the potassium ions. For example, alkali metal ions other than potassium ions, alkaline earth metal ions, transition metal ions and the like may be contained. The aqueous electrolyte solution 20 may also contain one or more anions as counter ions to carrier ions. There is no particular limitation on the type of anions.

The concentration of the electrolyte in the aqueous electrolyte solution 20 is not particularly limited. The concentration of the electrolyte in the aqueous electrolyte solution 20 can be adjusted according to the desired performance. According to the present inventors' finding, the higher the concentration of electrolyte in the aqueous electrolyte solution 20, the potential window of the aqueous electrolyte solution 20 expands more easily. Also, the higher the concentration, the capacity of the aqueous battery 100 increases more easily. Furthermore, the higher the concentration, the elution of the current collector into the aqueous electrolyte solution 20 is suppressed more easily. Meanwhile, the lower the concentration, the viscosity of the aqueous electrolyte solution 20 decreases more easily.

1.2.2.1 Potassium Ion Source

The electrolyte which can serve as a potassium ion source may be various potassium compounds which can dissolve in water to produce potassium ions. The electrolyte contained in the aqueous electrolyte solution 20 may be at least one selected from $KPF_6$, $KBF_4$, $K_2SO_4$, $KNO_3$, $CH_3COOK$, $(CF_3SO_2)_2NK$, $KCF_3SO_3$, $(FSO_2)_2NK$, $K_2HPO_4$, $KH_2PO_4$, $KPO_3$, $K_4P_2O_7$, $K_5P_3O_{10}$, $K_6P_4O_{13}$, $K_7P_5O_{16}$, $(KPO_3)n$ and the like. According to the present inventors' finding, when the aqueous electrolyte solution 20 contains a phosphate or acetate of potassium as the electrolyte, especially a phosphate, and more especially potassium pyrophosphate ($K_4P_2O_7$), the capacity of the aqueous battery 100 is easily increased. When the aqueous electrolyte solution 20 contains potassium pyrophosphate as the electrolyte, it may contain other electrolytes together with potassium pyrophosphate. In this case, potassium pyrophosphate may account for 50 mol % or more and 100 mol % or less, 70 mol % or more and 100 mol % or less, or 90 mol % or more and 100 mol % or less, of the total amount of the electrolyte dissolved in the aqueous electrolyte solution 20 (100 mol %), and the other electrolytes may account for 0 mol % or more and 50 mol % or less, 0 mol % or more and 30 mol % or less, or 0 mol % or more and 10 mol % or less.

As mentioned above, the aqueous electrolyte solution 20 may contain water and potassium pyrophosphate dissolved in water. The aqueous electrolyte solution 20 may also contain water, potassium pyrophosphate dissolved in water, and other potassium ion sources dissolved in water. In the aqueous electrolyte solution 20, "potassium pyrophosphate dissolved in water" may be present as ions such as $K^+$, $P_2O_7^{4-}$, $KP_2O_7^{3-}$, $K_2P_2O_7^{2-}$ and $K_3P_2O_7^-$, or as an aggregate of these ions. In the aqueous electrolyte solution 20, "concentration of potassium pyrophosphate dissolved in water" is specified by converting ions and aggregates contained in the aqueous electrolyte solution 20 to potassium pyrophosphate. When the aqueous electrolyte solution 20 contains pyrophosphate ions as anions (which may be present in a state of being associated with cations, such as $KP_2O_7^{3-}$, $K_2P_2O_7^-$ and $K_3P_2O_7^-$, in addition to $P_2O_7^{4-}$, as mentioned above), the entire pyrophosphate ions contained in the aqueous electrolyte solution 20 does not have to be converted as "dissolved potassium pyrophosphate". In other words, the aqueous electrolyte solution 20 may contain more pyrophosphate ions than the concentration which can be converted as potassium pyrophosphate. For example, in case pyrophosphate ion sources other than $K_4P_2O_7$ (e.g., $K_4P_2O_7$) are added and dissolved in water together with $K_4P_2O_7$ when producing the aqueous electrolyte solution 20, the aqueous electrolyte solution 20 will contain more pyrophosphate ions than the concentration which can be converted as potassium pyrophosphate.

The aqueous electrolyte solution 20 may contain water and potassium pyrophosphate dissolved at a concentration above a certain level in 1 kg of water. The concentration of potassium pyrophosphate may be, for example, 2.5 mol or more, 3.0 mol or more, 3.5 mol or more, or 4.0 mol or more per 1 kg of water. The upper limit of the concentration of potassium pyrophosphate in the aqueous electrolyte solution 20 is not particularly limited, but excessively high concentration may cause an excessive increase in viscosity of the aqueous electrolyte solution 20. In this regard, the concentration of potassium pyrophosphate may be 7 mol or less or 6 mol or less per 1 kg of water. According to the present inventors' finding, when only potassium pyrophosphate is dissolved in water in the aqueous electrolyte solution 20, the freezing point of the aqueous electrolyte solution decreases as the concentration of potassium pyrophosphate in water increases, and the freezing point substantially disappears when the concentration of potassium pyrophosphate in the aqueous electrolyte solution exceeds a certain level. In other words, when the concentration of potassium pyrophosphate in the aqueous electrolyte solution is above a certain level, the aqueous electrolyte solution has no freezing point at −60° C. or higher. Specifically, when the aqueous electrolyte solution 20 contains water and potassium pyrophosphate dissolved in the concentration of 4 mol or more per 1 kg of water, the capacity of the aqueous battery 100 increases and the freezing point of the aqueous electrolyte solution 20 disappears, and thus the aqueous electrolyte solution 20 has no freezing point at −60° C. or higher. However, if other components are dissolved in water together with potassium pyrophosphate in the aqueous electrolyte solution 20, the minimum concentration of potassium pyrophosphate at which the freezing point of the aqueous electrolyte solution disappears may be lower than 4 mol. According to the present inventors' finding, even when the aqueous electrolyte solution 20 contains water and potassium ions, and the molar ratio ($H_2O/K$) of water to potassium ions is 3.5 or less, and the aqueous electrolyte solution 20 contains potassium pyrophosphate dissolved in water, the above freezing point disappearing effect is easily obtained. In this case, at least a part of "potassium ions" are derived from potassium pyrophosphate. "Potassium ions" may also form an aggregate in close proximity to anions, as mentioned above. The molar ratio of water to potassium ions in the aqueous electrolyte solution 20 can be easily specified by measuring the amount of water and the amount of K dissolved in water.

1.2.2.2 Lithium Ion Source

The electrolyte which can serve as a lithium ion source may be various lithium compounds which can dissolve in water to produce lithium ions. The electrolyte contained in the aqueous electrolyte solution 20 may be at least one selected from $LiPF_6$, $LiBF_4$, $Li_2SO_4$, $LiNO_3$, $CH_3COOLi$, $(CF_3SO_2)_2NLi$, $LiCF_3SO_3$, $(FSO_2)_2NLi$, $Li_2HPO_4$, $LiH_2PO_4$, $LiPO_3$, $Li_4P_2O_7$, $Li_5P_3O_{10}$, $Li_6P_4O_{13}$, $Li_7P_5O_{16}$, $(LiPO_3)n$ and the like. In particular, when containing at least one imide salt of lithium bis-trifluoromethanesulfonylimide ($(CF_3SO_2)_2NLi$, LiTFSI) and lithium bisfluorosulfonylimide ($(FSO_2)_2NLi$, LiFSI), the performance of the aqueous battery 100 is easily enhanced. In other words, the aqueous electrolyte solution 20 may contain water and the lithium imide salt dissolved in water. The aqueous electrolyte solution 20 may also contain water, the lithium imide salt dissolved in water, and other lithium ion sources dissolved in water. For example, the aqueous electrolyte solution 20 may contain water and the lithium imide salt dissolved in the concentration of 1 mol or more per 1 kg of water. The concentration of the lithium imide salt per 1 kg of water may be 5 mol or more, 10 mol or more, 15 mol or more, or 20 mol or more and may be 40 mol or less, 35 mol or less, 30 mol or less, or 25 mol or less.

1.2.2.3 Sodium Ion Source

The electrolyte which can serves as a sodium ion source may be various sodium compounds which can dissolve in water to produce sodium ions. The electrolytes contained in the aqueous electrolyte solution 20 may be at least one selected from $NaPF_6$, $NaBF_4$, $Na_2SO_4$, $NaNO_3$, $CH_3COONa$, $(CF_3SO_2)_2NNa$, $NaCF_3SO_3$, $(FSO_2)_2NNa$, $Na_2HPO_4$, $NaH_2P_{04}$, $NaPO_3$, $Na_4P_2O_7$, $Na_5P_3O_{10}$, $Na_6P_4O_{13}$, $Na_7P_5O_{16}$, $(NaPO_3)n$ and the like. In particular, when containing $NaCF_3SO_3$, the performance of the aqueous battery 100 is easily enhanced. In other words, the aqueous electrolyte solution 20 may contain water and $NaCF_3SO_3$ dissolved in water. The aqueous electrolyte solution 20 may also contain water, $NaCF_3SO_3$ dissolved in water, and other sodium ion sources dissolved in water. For example, the aqueous electrolyte solution 20 may contain water and $NaCF_3SO_3$ dissolved in the concentration of 1 mol or more per 1 kg of water. The concentration of $NaCF_3SO_3$ per 1 kg of water may be 3 mol or more, 5 mol or more, 7 mol or more, or 9 mol or more, and may be 20 mol or less, 18 mol or less, 16 mol or less, or 14 mol or less.

1.2.2.4 Zinc Ion Source

The electrolyte which can serve as a zinc ion source may be various zinc compounds which can dissolve in water to produce zinc ions. The electrolyte contained in the aqueous electrolyte solution 20 may be at least one selected from $ZnSO_4$, $Zn(CF_3SO_3)_2$, $Zn(NO_3)_2$, $ZnCl_2$, $ZnI_2$, ZnO, $ZnCO_3$ and the like. In particular, when containing $ZnSO_4$, the performance of the aqueous battery 100 is easily enhanced. In other words, the aqueous electrolyte solution 20 may contain water and $ZnSO_4$ dissolved in water. The aqueous electrolyte solution 20 may also contain water, $ZnSO_4$ dissolved in water, and other zinc ion sources dissolved in water. For example, the aqueous electrolyte solution 20 may contain water and $ZnSO_4$ dissolved in the concentration of 1 mol or more per 1 kg of water. The concentration of $ZnSO_4$ may be 2 mol or more, and may be 20 mol or less, 15 mol or less, 10 mol or less, or 5 mol or less per 1 kg of water.

1.2.3 Other Components

The aqueous electrolyte solution 20 may contain, in addition to the solvents and electrolytes mentioned above, an acid, a hydroxide and the like to adjust the pH of the aqueous electrolyte solution 20. Various additives may also be contained.

1.2.4 pH

The pH of the aqueous electrolyte solution 20 is not particularly limited. However, if the pH is too high, the potential window on the oxidation side of the aqueous electrolyte solution may narrow. In this regard, the pH of the aqueous electrolyte solution may be 3 or more and 13 or less. The pH may be 4 or more, 5 or more, 6 or more, or 7 or more, and may be 12 or less.

1.2.5 Freezing Point

The aqueous electrolyte solution 20 may have no freezing point at −60° C. or higher. Here, the presence or absence of the "freezing point" of the aqueous electrolyte solution 20 is confirmed by differential scanning calorimetry (DSC). The sweep rate by DSC is set at 5° C./min for both descending and ascending temperatures, and the sweep range is from room temperature down to −120° C. and then up to 40° C. The atmosphere in DSC is an atmosphere of inert gas such as Ar, and the pressure is equal to atmospheric pressure. However, since a sealed aluminum container is used for the evaluation, the atmosphere inside the container is sealed atmosphere under atmospheric pressure. If no crystallization peak temperature (freezing point temperature) is confirmed at −60° C. or higher when the measurement is carried out on the aqueous electrolyte solution under the above conditions, the aqueous electrolyte solution is considered to have "no freezing point at −60° C. or higher". The aqueous electrolyte solution 20 may have no freezing point at −80° C. or higher, no freezing point at −100° C. or higher, or no freezing point at −120° C. or higher. In the aqueous battery 100 of the present disclosure, in order to achieve the condition that "aqueous electrolyte solution 20 has no freezing point at −60° C. or higher", it is effective to make the concentration of the electrolyte in the aqueous electrolyte solution 20 high (e.g., dissolving potassium pyrophosphate in high concentration of 4 mol or more per 1 kg of water), as mentioned above. When the aqueous electrolyte solution 20 has no freezing point at −60° C., it becomes difficult for metals contained in the current collector to elute into the aqueous electrolyte solution 20. When the aqueous electrolyte solution 20 has no freezing point at −60° C. or higher, the aqueous battery 100 can be used at extremely low temperature. In other words, the aqueous battery 100 will operate properly even in cold regions.

1.2.6 Presence or Absence of Salt Precipitation

It is preferable that the aqueous electrolyte solution 20 is not accompanied by salt precipitation when cooled from 0° C. to −60° C. Thus, when the aqueous electrolyte solution 20 is not accompanied by salt precipitation due to temperature change, stable ionic conduction is possible even at low temperature. For example, the aqueous battery 100 can be used even at extremely low temperature, such as in cold regions. The aqueous electrolyte solution 20 may contain water and potassium pyrophosphate dissolved in water, as mentioned above. Here, according to the inventors' finding, the saturation solubility of potassium pyrophosphate in water has low temperature dependence and hardly changes at low temperature of 0° C. or lower. In this regard, even if potassium pyrophosphate is dissolved in the aqueous electrolyte solution 20 at 0° C. in high concentration (e.g., high concentration of 4 mol or more per 1 kg of water) and the aqueous electrolyte solution 20 is cooled from 0° C. to −60° C., precipitation of potassium pyrophosphate in the aqueous electrolyte solution 20 does not substantially occurs.

1.2.7 Viscosity

If the viscosity of the aqueous electrolyte solution 20 is too high, the ionic conductivity of the aqueous electrolyte solution 20 may decrease. Meanwhile, if the electrolyte is dissolved at high concentration in the aqueous electrolyte solution 20, aqueous electrolyte solution 20 can have a viscosity above a certain level. The aqueous electrolyte solution 20 may have a viscosity of 10 mPa-s or more and 350 mPa-s or less at 20° C. The viscosity may be 15 mPa-s or more, 20 mPa-s or more, 30 mPa-s or more, or 40 mPa-s or more, and may be 300 mPa-s or less, 250 mPa-s or less, or 200 mPa-s or less.

1.3 Negative Electrode

The negative electrode 30 contains an inorganic compound as the negative electrode active material, and the inorganic compound has a crystal structure belonging to a space group I23. The negative electrode 30 can take a known configuration as the negative electrode of an aqueous battery, except that the above specific negative electrode active material is contained. As shown in FIG. 1, the negative electrode 30 can include a negative electrode active material layer 31 and a negative electrode current collector 32. In this case, the negative electrode active material layer 31 contains the above specific negative electrode active material.

1.3.1 Negative Electrode Active Material Layer

The negative electrode active material layer 31 contains, as the negative electrode active material, an inorganic compound having a crystal structure belonging to a space group I23. The negative electrode active material layer 31 may contain, in addition to the negative electrode active material, a conductive aid, a binder and various additives. The negative electrode active material layer 31 can be impregnated with the aqueous electrolyte solution 20. The content of each component in the negative electrode active material layer 31 may be appropriately determined according to the desired battery performance. For example, the content of the negative electrode active material may be 40% by mass or more, 50% by mass or more, 60% by mass or more, or 70% by mass or more, and may be 100% by mass or less, or 90% by mass or less, based on 100% by mass of the entire negative positive electrode active material layer 31 (total solid content). The shape of the negative electrode active material layer 31 is not particularly limited, and the negative electrode active material layer may be, for example, a sheet-shaped negative electrode active material layer with almost flat surface. The thickness of the negative electrode active material layer 31 is not particularly limited, and may be, for example, 0.1 μm or more, 1 μm or more, or 10 μm or more, and may be 2 mm or less, 1 mm or less, or 500 μm or less.

Figure 2:
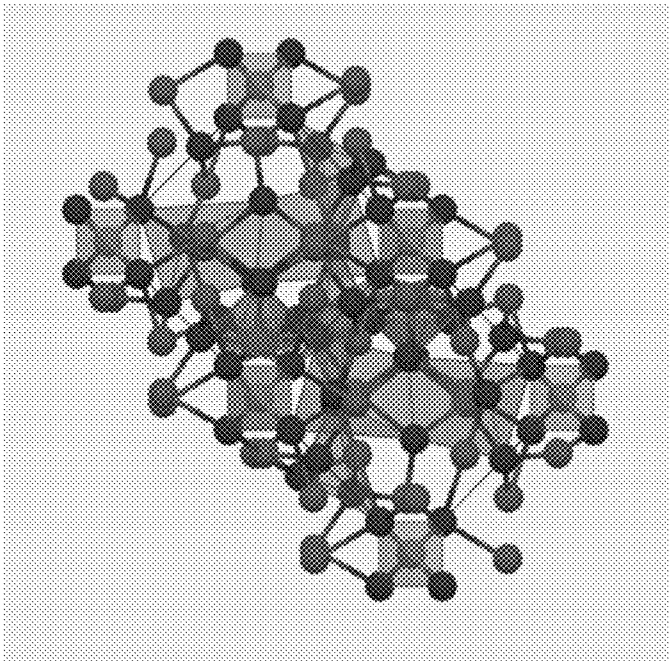
FIG. 2 schematically shows one example of a crystal structure belonging to a space group I23.
Figure 3:
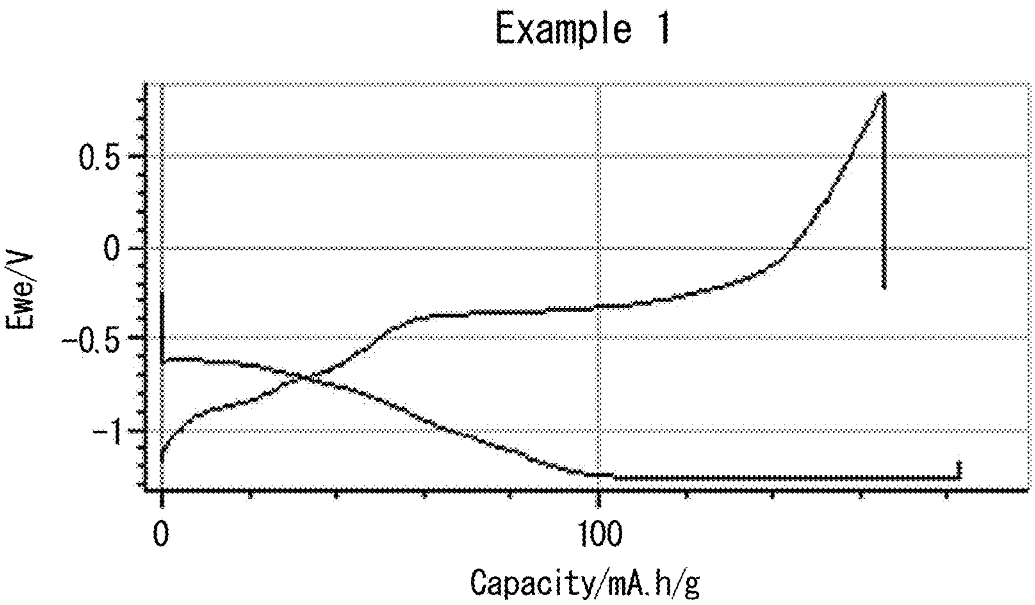
FIG. 3 shows a charge-discharge curve of a test cell of Example 1.
Figure 4:
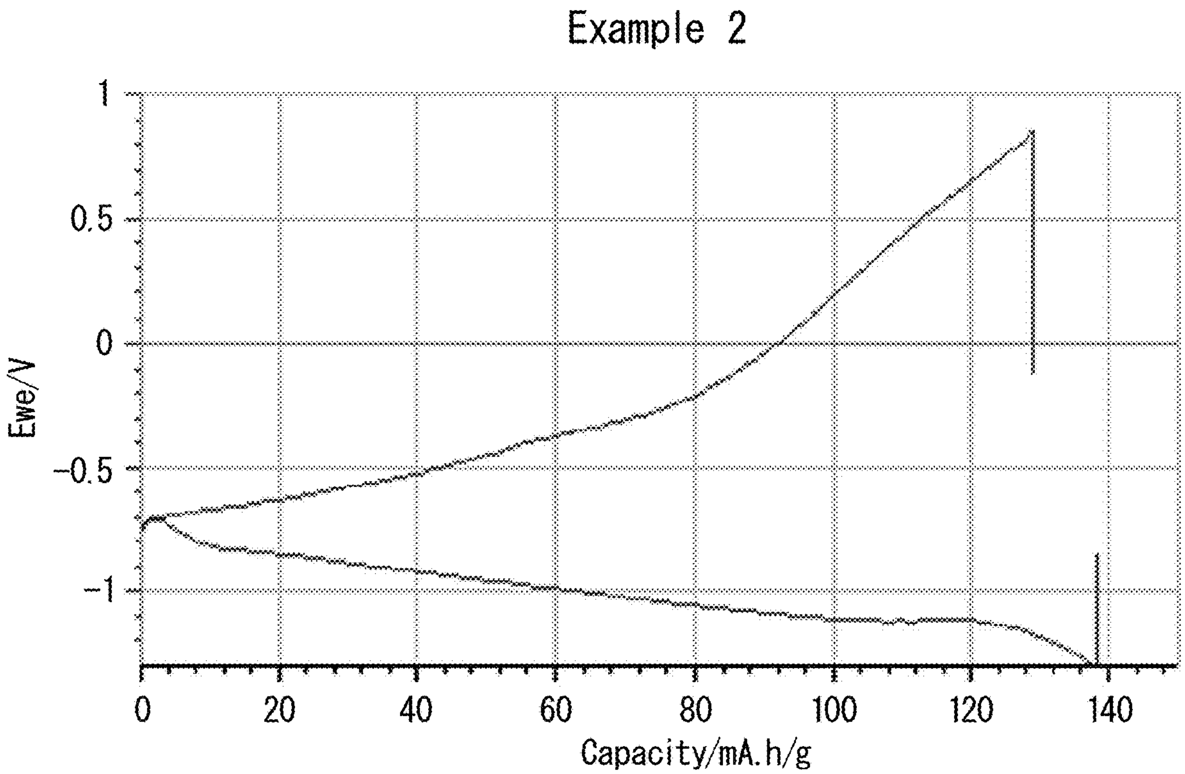
FIG. 4 shows a charge-discharge curve of a test cell of Example 2.
Figure 5:
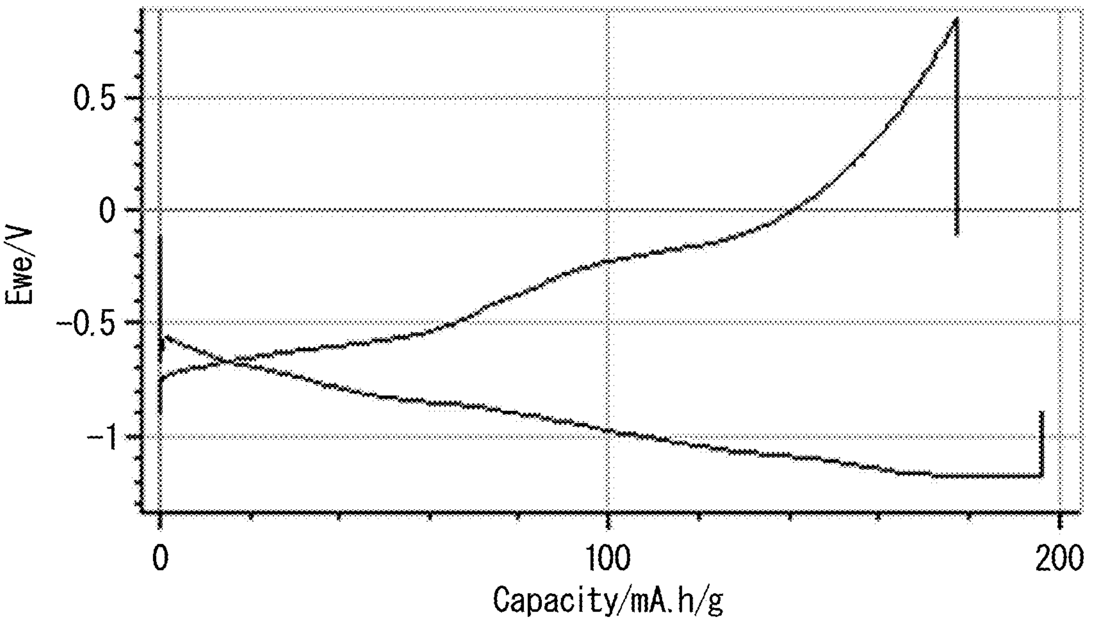
FIG. 5 shows a charge-discharge curve of a test cell of Example 3.
Figure 6:
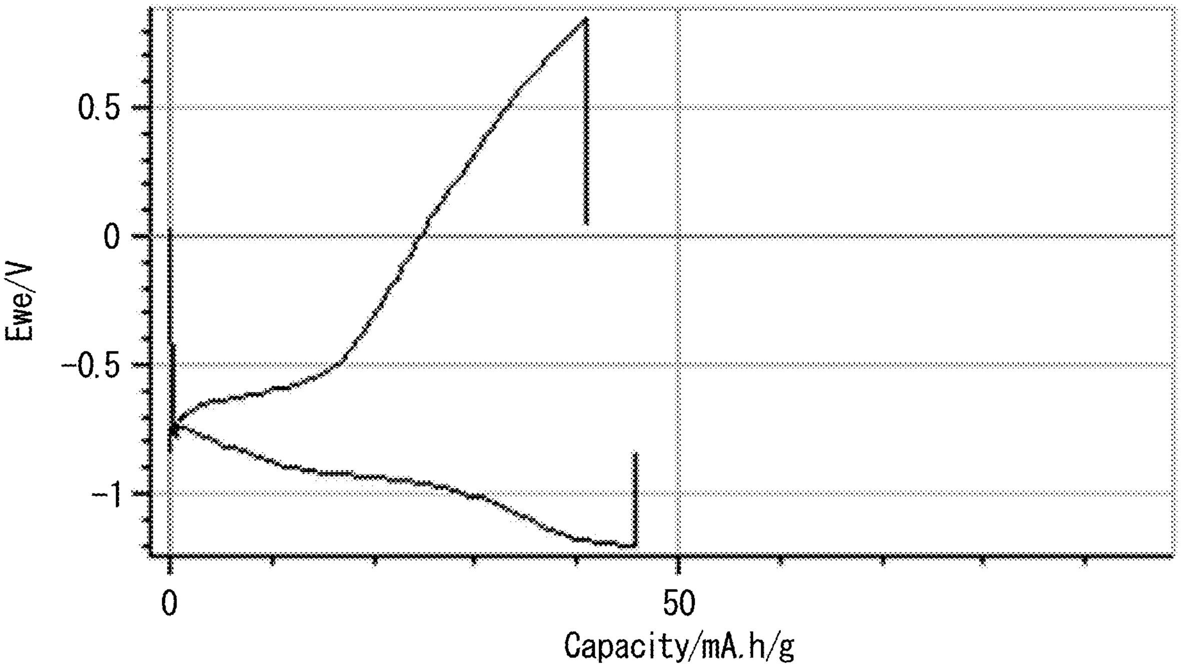
FIG. 6 shows a charge-discharge curve of a test cell of Example 4.
Figure 7:
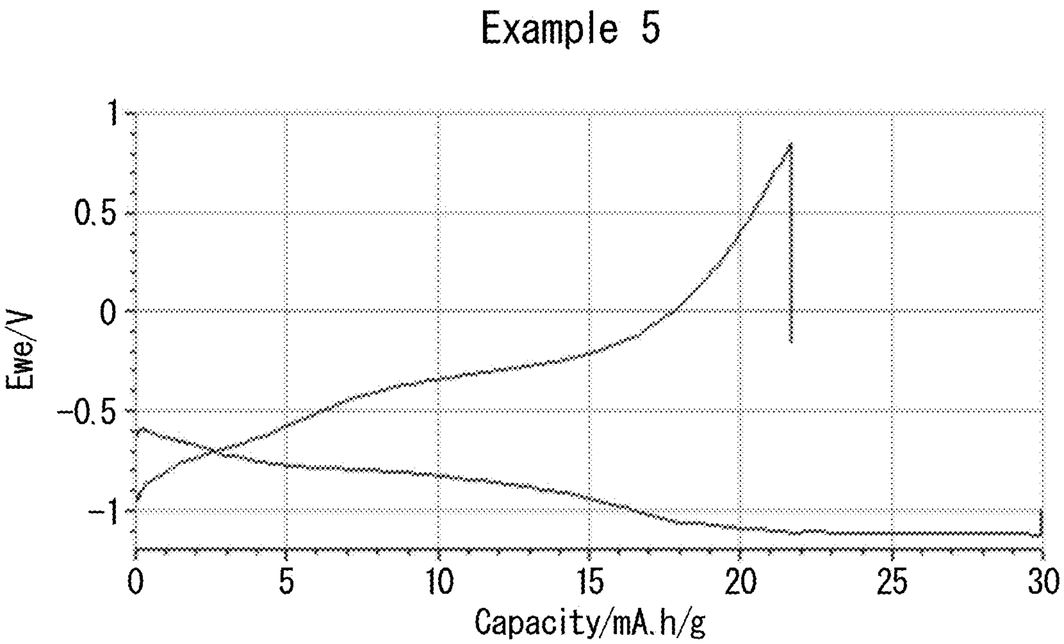
FIG. 7 shows a charge-discharge curve of a test cell of Example 5.

FIG. 2 shows one example of a crystal structure belonging to a space group I23. The crystal structure shown in FIG. 2 has a chemical composition represented by $Bi_{12}MnO_{20}$, but may have other chemical compositions. As shown in FIG. 2, the crystal structure belonging to a space group I23 has spaces and gaps in some parts of the structure, and it is considered that alkali metal ions and zinc ions are inserted or de-inserted through such spaces and gaps by intercalation. As far as the present inventors have confirmed, the inorganic compound having a crystal structure belonging to a space group I23 has a charge-discharge potential lower than that of the positive electrode active material mentioned above, and can charge and discharge various carrier ions within the potential window of the aqueous electrolyte solution 20 mentioned above.

The inorganic compound having a crystal structure belonging to a space group I23 may contain, for example, element A, element M and O. Here, the element A is at least one of Bi and La, and the element M is at least one of Bi, Mn, Fe, Co, Ti and Ni. Both the element A and the element M may be Bi. When the element A is at least one of Bi and La and the element M is at least one of Bi, Mn, Fe, Co, Ti and Ni, it is considered that alkali metal ions and zinc ions are more easily inserted or de-inserted in the above crystal structure. In particular, when the element A is Bi, higher effect can be expected. In addition, when the element M is at least one of Mn, Fe, Co and Ni, higher effect can be expected. Furthermore, when the element A is Bi and the element M is at least one of Mn, Fe and Ni, particularly high effect is expected. The inorganic compound having a crystal structure belonging to a space group I23 may have, for example, chemical compositions represented by "$A_4M_6O_{19}$" (or "$A_4M_6ClO_{18}$") such as $La_4Re_6O_{19}$, $La_4Os_6O_{19}$, $Nd_4Os_6O_{19}$, $La_4Ru_6O_{19}$, $Ba_4Os_6ClO_8$, $Sr_4Ru_6ClO_{18}$, $Pr_4Re_6O_{19}$, $Nd_4Re_6O_{19}$, $Ce_4Re_6O_{19}$, $Ca_4Rh_6Pb_{19}$ and $Yb_4Rh_6Pb_{19}$, chemical compositions represented by "$A_{12}MO_{20}$" such as $Bi_{12}GeO_{20}$, $Bi_{12}SiO_{20}$, $Bi_{12}TiO_{20}$, $Bi_{12}AsO_{20}$, $Bi_{12}PbO_{20}$, $Bi_{12}CoO_{20}$, $Bi_{12}PO_{20}$, $Bi_{12}GaO_{20}$, $Bi_{13}O_{20}$, $Bi_{12}AlO_{20}$, $Bi_{12}SbO_{20}$, $Bi_{12}MnO_{20}$, $Bi_{12}RuO_{20}$, $Bi_{12}BO_{20}$, $Bi_{12}DyO_{20}$, $Bi_{12}YO_{20}$, $Bi_{12}HoO_{20}$, $Bi_{12}ErO_{20}$, $Bi_{12}YbO_{20}$, $Bi_{12}ZnO_{20}$, $Bi_{12}NiO_{20}$, $Bi_{12}NaO_{20}$, $Bi_{12}BeO_{20}$, $Bi_{12}LiO_{20}$, $Bi_{12}IrO_{20}$ and $Bi_{12}FeO_{20}$, and chemical compositions such as $La_2Ti_3O_9$, $Ba_2Ir_3O_9$, $Bi_2O_3$, $YbCd_6$ and $K_7Be_{12}P_{12}O_{48}$. In $A_4M_6O_{19}$ (or $A_4M_6ClO_{18}$) and $A_{12}MO_{20}$, A may be composed of two or more elements and M may be composed of two or more elements. For example, $Bi_{25}FeO_{40}$ can also be referred to as $Bi_{12}BiO_{0.5}$ $FeO_{0.5}O_{20}$, and it can be said to be a type of a chemical composition represented by $A_{12}MO_{20}$.

The inorganic compound having a crystal structure belonging to a space group I23 can be produced, for example, by reacting various raw materials in a solid or liquid phase. Specifically, the inorganic compound may be produced by mixing a compound containing the above element A (various salts such as carbonates, oxides, hydroxides, etc.) and a compound containing the above element M (various salts such as carbonates, oxides, hydroxides, etc.), followed by firing or heating in an oxygen-containing atmosphere at a predetermined temperature. Here, the ratio of the various raw materials before firing or heating does not necessarily have to match the desired chemical composition ratio. As shown in Examples below, the crystal structure belonging to a space group I23 may be obtained together with other crystal structures as one type of plural types of crystal structures.

The negative electrode active material may contain other compounds together with the inorganic compound having the crystal structure belonging to a space group I23. For example, the negative electrode active material may contain, as other compounds, at least one compound selected from potassium-transition metal composite oxide; titanium oxide; metal sulfides such as $Mo_6S_8$; elemental sulfur; $KTi_2(PO_4)_3$; NASICON-type compounds and the like. Other compounds may insert or de-insert carrier ions by intercalation or by conversion or alloying reaction. The negative electrode active material may be used alone, or two or more thereof may be used in combination.

The shape of the negative electrode active material may be any shape which can function as the negative electrode active material of the battery. The negative electrode active material may be, for example, particulate. The negative electrode active material may be either solid or hollow, and may have voids or may be porous. The negative electrode active material may be either a primary particle or a secondary particle in which a plurality of primary particles are agglomerated. The mean particle diameter D50 of the negative electrode active material may be, for example, 1 nm or more, 5 nm or more, or 10 nm or more, and may be 500 μm or less, 100 μm or less, 50 μm or less, or 30 μm or less.

Examples of the conductive aid which can be contained in the negative electrode active material layer 31 include carbon materials such as vapor-phase-grown carbon fiber (VGCF), acetylene black (AB), Ketjen black (KB), carbon nanotube (CNT) and carbon nanofiber (CNF); and metallic materials which are insoluble in an electrolyte solution, including nickel, titanium, aluminum, stainless steel and the like. The conductive aid may be, for example, particulate or fibrous, and its size is not particularly limited. The conductive aid may be used alone, or two or more thereof may be used in combination.

Examples of the binder which can be contained in the negative electrode active material layer 31 include butadiene rubber (BR)-based binders, butylene rubber (IIR)-based binders, acrylate-butadiene rubber (ABR)-based binders, styrene-butadiene-based rubber (SBR) binders, polyvinylidene fluoride (PVdF)-based binders, polytetrafluoroethylene (PTFE)-based binders, polyimide (PI)-based binders, polyacrylic acid-based binders and the like. The binder may be used alone, or a two or more thereof may be used in combination.

1.3.2 Negative Electrode Current Collector

As shown in FIG. 1, the negative electrode 30 can include a negative electrode current collector 32 which is in contact with the negative electrode active material layer 31. The negative electrode current collector 32 may be in contact with the aqueous electrolyte solution 20. It is possible to employ, as the negative electrode current collector 32, any material which can function as a negative electrode current collector of an aqueous battery. The negative electrode current collector 32 may be in the form of foil, plate, mesh or perforated metal, and foamed body. The negative electrode current collector 32 may be composed of a metal foil or metal mesh. In particular, the metal foil is excellent in handleability or the like. The negative electrode current collector 32 may be composed of a plurality of foils. Examples of the metallic material constituting the negative electrode current collector 32 include those containing at least one element selected from the group consisting of Cu, Ni, Al, V, Au, Pt, Mg, Fe, Ti, Pb, Co, Cr, Zn, Ge, In, Sn and Zr. In particular, the negative electrode current collector 32 preferably contains at least one element selected from the group consisting of Al, Ti, Pb, Zn, Sn, Mg, Zr and In, and preferably contains Al. All the Al, Ti, Pb, Zn, Sn, Mg, Zr and In have low work function, and even if the negative electrode current collector 32 comes into contact with the aqueous electrolyte 20 at a reduction potential, it is considered that electrolysis of the aqueous electrolyte solution 20 is less likely to occur. The negative electrode current collector 32 may be a metal foil or base material on which the above metals are plated or vapor-deposited. When the negative electrode current collector 32 is composed of a plurality of metal foils, it may have some layer between the plurality of metal foils. The thickness of the negative electrode current collector 32 is not particularly limited. For example, the thickness may be 0.1 μm or more, or 1 μm or more, and may be 1 mm or less, or 100 μm or less.

1.4 Other Configurations

The aqueous battery 100 may have, in addition to the basic configuration mentioned above, for example, the following other configurations.

1.4.1 Separator As mentioned above, in the aqueous battery 100, a separator 40 can be present between the positive electrode 10 and the negative electrode 30. It is possible to employ, as the separator 40, separators used in conventional aqueous electrolyte solution batteries (nickel-metal hydride batteries, zinc-air batteries, etc.). For example, it is a separator of a material having hydrophilicity, such as a nonwoven fabric made of cellulose. The thickness of the separator 40 is not particularly limited, and may be, for example, 5 μm or more and 1 mm or less.

1.4.2 Terminals or the Like

The aqueous battery 100 can include, in addition to the above configurations, terminals, battery casing and the like. Other configurations are obvious to those skilled in the art with reference to the present application, and are omitted here.

1.5 Method for Producing Aqueous Battery

The aqueous battery 100 of the present disclosure can be produced, for example, as follows.

(1) The positive electrode 10 is produced, for example, as follows. The positive electrode active material constituting the positive electrode active material layer 11 is dispersed in a solvent to obtain a positive electrode mixture paste (slurry). The solvent used in this case is not particularly limited, and water and various organic solvents can be used. The positive electrode mixture paste (slurry) is coated on the surface of the positive electrode current collector 12 using a doctor blade or the like, and then dried to form a positive electrode active material layer 11 on the surface of the positive electrode current collector 12, thus obtaining a positive electrode 10. It is possible to employ, as the coating method, an electrostatic coating method, a dip coating method, a spray coating method and the like, in addition to a doctor blade method.

(2) The aqueous electrolyte solution 20 can be produced, for example, by mixing water and an electrolyte. There is no particular limitation on the mixing method, and any known mixing method can be employed. Even if water and an electrolyte are simply filled in a container and left to stand, they mix with each other and the aqueous electrolyte solution 20 is finally be obtained.

(3) The negative electrode 30 is produced, for example, as follows. The negative electrode active material constituting the negative electrode active material layer 31 is dispersed in a solvent to obtain a negative electrode mixture paste (slurry). The solvent used in this case is not particularly limited, and water and various organic solvents can be used. The negative electrode mixture paste (slurry) is coated on the surface of the negative electrode current collector 32 using a doctor blade or the like, and then dried to form a negative electrode active material layer 31 on the surface of the negative electrode current collector 32, thus obtaining a negative electrode 30. It is possible to employ, as the coating method, an electrostatic coating method, a dip coating method, a spray coating method and the like, in addition to a doctor blade method.

(4) The positive electrode 10, the aqueous electrolyte solution 20 and the negative electrode 30 are housed in a battery casing to obtain an aqueous battery 100. For example, a separator 40 is sandwiched between the positive electrode 10 and negative electrode 30 to obtain a laminated body including the positive electrode current collector 12, the positive electrode active material layer 11, the separator 40, the negative electrode active material layer 31 and the negative electrode current collector 32 in this order. Other components such as terminals are attached to the laminated body as necessary. The laminated body is housed in a battery casing and the battery casing is filled with the aqueous electrolyte solution 20, and then the laminated body and the electrolyte solution are sealed in the battery casing so that the laminated body is immersed in the aqueous electrolyte solution 20 to obtain an aqueous battery 100.

1.6 Effect Due to Aqueous Battery

For potassium ions and zinc ions, there are few reported examples of inorganic active materials due to their large ionic radius. In other words, there is little knowledge on what inorganic compounds can be used as active materials, and the current situation is that the activity of a number of inorganic compounds is being confirmed one by one. In particular, research on aqueous batteries is still in its infancy, with even fewer examples reported than for non-aqueous batteries, and only organic compounds such as Prussian blue have been investigated. Organic compounds have a large space in the lattice, which is disadvantageous from the viewpoint of energy density. In contrast, in the aqueous battery 100 of the present disclosure, a predetermined inorganic compound is employed as the negative electrode active material. When employing the negative electrode active material composed of an inorganic compound, the energy density of the aqueous battery is easily improved compared to the case where an organic compound is employed as the negative electrode active material. The inorganic compound used in the aqueous battery of the present disclosure is also excellent in stability of the crystal structure, and from this viewpoint, the battery performance is also easily improved. Furthermore, the inorganic compound used in the aqueous battery of the present disclosure can be produced using inexpensive raw materials.

2. Negative Electrode Active Material for Aqueous Batteries

The technology of the present disclosure also has an aspect as a negative electrode active material for aqueous batteries. That is, the negative electrode active material of the present disclosure is used in an aqueous battery containing alkali metal ions or zinc ions as carrier ions, and contains an inorganic compound, wherein the inorganic compound has a crystal structure belonging to a space group I23. Details of the aqueous battery are as mentioned above.

3. Method for Improving Energy Density of Aqueous Battery

The technology of the present disclosure also has an aspect as a method for improving the energy density of an aqueous battery. That is, the method of the present disclosure comprises using, in an aqueous battery, an aqueous electrolyte solution satisfying the following requirements (1), and a negative electrode active material satisfying the following requirements (2). Details of the aqueous battery are as mentioned above.

(1) The aqueous electrolyte solution contains water and alkali metal ions or zinc ions.

(2) The negative electrode active material is an inorganic compound having a crystal structure belonging to a space group I23.

4. Vehicles Having Aqueous Battery

As mentioned above, the technology of the present disclosure can improve the energy density of an aqueous battery. Such aqueous battery can be suitably used, for example, in at least one type of vehicle selected from hybrid electric vehicles (HEV), plug-in hybrid electric vehicles (PHEV) and battery electric vehicles (BEV). That is, the technology of the present disclosure also has an aspect as a vehicle having an aqueous battery, wherein the aqueous battery includes a positive electrode, an aqueous electrolyte solution and a negative electrode, the aqueous electrolyte solution contains water and alkali metal ions or zinc ions, the negative electrode includes an inorganic compound as a negative electrode active material, and the inorganic compound has a crystal structure belonging to a space group I23. Details of the configuration of the aqueous battery are as mentioned above.

EXAMPLE

The technology of the present disclosure will be described in detail below while illustrating Examples, but the technology of the present disclosure is not limited to the following Examples.

1. Fabrications of Negative Electrode Active Material

1.1 Example 1

$Bi_2O_3$ and $Fe_2O_3$ were mixed in a molar ratio of Bi:Fe=1:1, formed into pellets, and then the temperature was raised to 650° C. at a temperature rise rate of 5° C./min, followed by firing and heating at 650° C. for 4 hours to obtain an intermediate material. The intermediate material thus obtained was heated again to 650° C. at a temperature rise rate of 5° C./min and then fired at 650° C. for 4 hours to obtain a negative electrode active material according to Example 1.

1.2 Example 2

$Bi_2O_3$ and MnO were mixed in a molar ratio of Bi:Mn=1:1, formed into pellets, and then the temperature was raised to 800° C. at a temperature rise rate of 5° C./min, followed by firing and heating at 800° C. for 4 hours to obtain an intermediate material. The intermediate material thus obtained was heated again to 800° C. at a temperature rise rate of 5° C./min and then fired at 800° C. for 4 hours to obtain a negative electrode active material according to Example 2.

1.3 Example 3

$Bi_2O_3$ and NiO were mixed in a molar ratio of Bi:Ni=1:1, formed into pellets, and then the temperature was raised to 850° C. at a temperature rise rate of 5° C./min, followed by firing and heating at 850° C. for 4 hours to obtain an intermediate material. The intermediate material thus obtained was heated again to 900° C. at a temperature rise rate of 5° C./min and then fired at 900° C. for 4 hours to obtain a negative electrode active material according to Example 3.

1.4 Example 4

$Bi_2O_3$, $Fe_2O_3$, MnO and CoO were mixed in a molar ratio of Bi:Fe:Mn:Co=1:0.33:0.33:0.33, and after forming into pellets, the temperature was raised to 600° C. at a temperature rise rate of 5° C./min, followed by firing at 600° C. for 4 hours to obtain a negative electrode active material according to Example 4.

1.5 Example 5

$Bi_2O_3$, $Fe_2O_3$ and MnO were mixed in a molar ratio of Bi:Fe:Mn=1:0.7:0.3, and after forming into pellets, the temperature was raised to 800° C. at a temperature rise rate of 5° C./min, followed by firing at 800° C. for 10 minutes to obtain a negative electrode active material according to Example 5.

2. Fabrications of Negative Electrode

After weighing the negative electrode active material of any one of Examples 1 to 5, Ti as a conductive aid, PTFE as a binder, and 2% by weight CMC as a thickener in a mass ratio of negative electrode active material:Ti:PTFE:2% by weight CMC=25.0:70.0:4.5:0.5, water was added thereto to fabricate ink. The ink thus obtained was coated on a Ti foil by a doctor blade and then dried to obtain a negative electrode for evaluation. The basis weight of the negative electrode active material of Example 1 was 1.627 mg, the basis weight of the negative electrode active material of Example 2 was 1.541 mg, the basis weight of the negative electrode active material of Example 3 was 1.528 mg, the basis weight of the negative electrode active material of Example 4 was 1.901 mg, and the basis weight of the negative electrode active material of Example 5 was 6.654 mg.

3. Fabrications of Aqueous Electrolyte Solution

The aqueous electrolyte solution for evaluation was obtained by dissolving 5 mol of $K_4P_2O_7$ in 1 kg of pure water. The aqueous electrolyte solution had a pH within a range of 3 or more and 13 or less and no freezing point at −60° C. or higher, and is not accompanied by salt precipitation when cooled from 0° C. to −60° C. and has a viscosity of 10 mPa-s or more and 350 mPa-s or less at 20° C.

4. Fabrications of Test Cell

A test cell with the following configuration was fabricated using the negative electrode of any one of Examples 1 to 5 and the aqueous electrolyte solution mentioned above.

Cell: VM5 (manufactured by EC FRONTIER CO., LTD.)

Working electrode: Negative electrode mentioned above

Counter electrode: Pt mesh

Reference electrode: Ag/AgCl

5. Evaluation of Cell

Each test cell was charged and discharged under the following conditions to obtain a charge-discharge curve.

Charge/discharge current value: ±0.1 mA/cm$^2$

Cut-off voltage: −1.20 to 0.85 V vs. Ag/AgCl

Measurement temperature: 25° C.

6. Evaluation Results

6.1 Charge-Discharge Curve

FIGS. 3 to 7 show the charge-discharge evaluation results for each of the test cells of Examples 1 to 5. As shown in FIGS. 3 to 7, all the negative electrode active materials of Examples 1 to 5 occlude or release potassium ions as carrier ions at a predetermined potential in an aqueous electrolyte solution, thus indicating that they can be used as the negative electrode active material for aqueous potassium ion batteries.

6.2 Crystal Structure Contained in Negative Electrode Active Material

Figure 8:
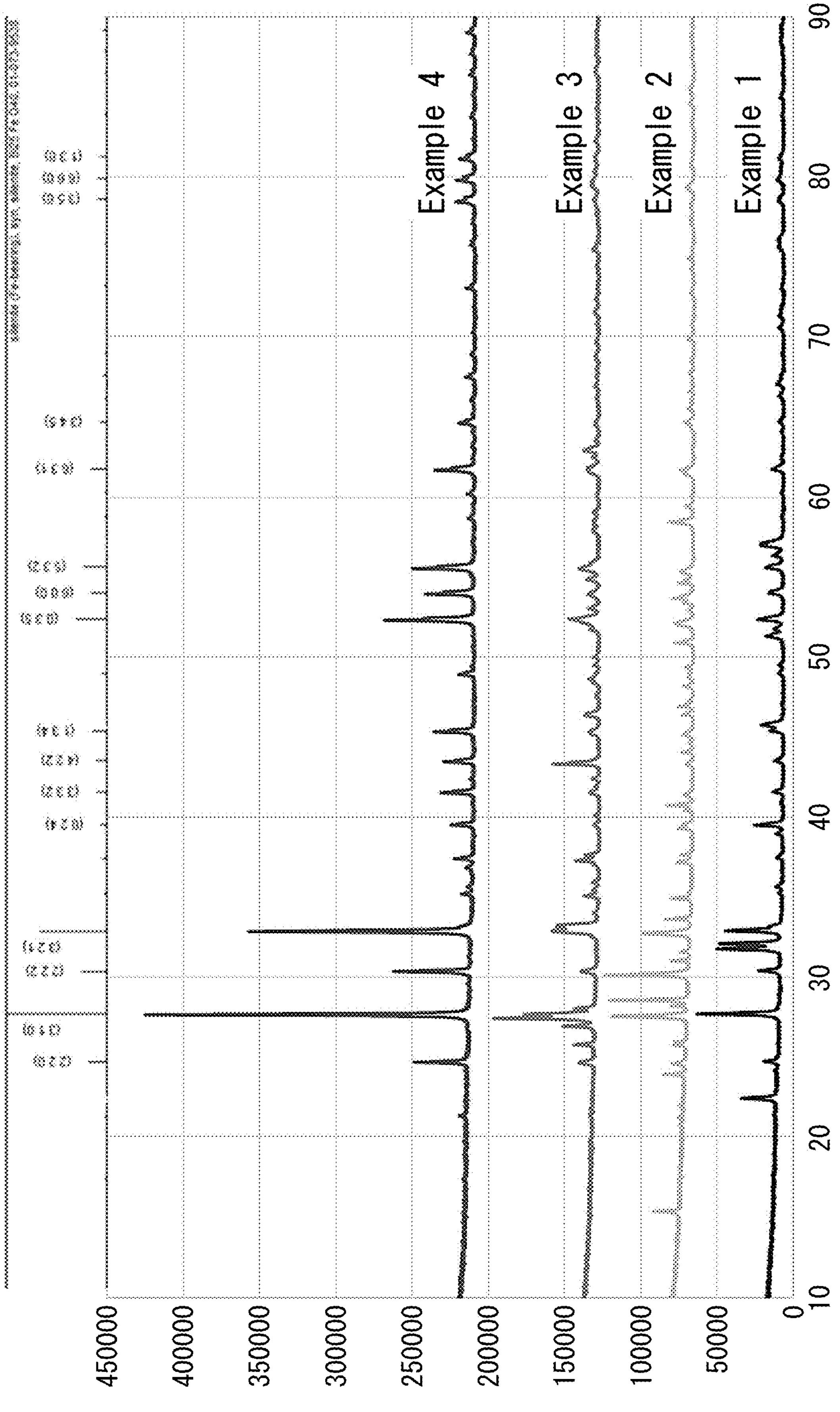
FIG. 8 shows an X-ray diffraction peak for each of negative electrode active materials of Examples 1 to 4.

The crystal phases contained in each of the negative electrode active materials of Examples 1 to 5 were identified by X-ray diffraction. The results are shown in Table 1 below. FIG. 8 shows an X-ray diffraction peak for each of negative electrode active materials of Examples 1 to 4.

TABLE 1

| | Space group | Chemical composition (estimation) of crystalline phase contained in negative electrode active material | Crystal system | Remarks |
|---|---|---|---|---|
| Example 1 | I23(197) | $Bi_{25}FeO_{40}$ | Cubic | — |
| | R3c(161) | $BiFeO_3$ | Trigonal | — |
| | R-3c | $Fe_2O_3$ | Trigonal | Inert phase |
| Example 2 | Pbam(55) | $Bi_{3.83}MngO_{20}$ | Orthorhombic | — |
| | I23(197) | $Bi_{12}MnO_{20}$ | Cubic | — |
| Example 3 | P21/c(14) | $Bi_2O_3$ | Monoclinic | Inert phase |
| | Fm-3m | NiO | Cubic | Inert phase |
| | I23(197) | $Bi_{12}NiO_{19}$ | Cubic | — |
| Example 4 | I23(197) | $Bi_{25}FeO_{40}$ | Cubic | — |
| | R-3c | $Fe_2O_3$ | Trigonal | Inert phase |
| | Fd-3m | $Co_3O_4$ | Cubic | Inert phase |
| Example 5 | R3c(161) | $Bi(Fe_{0.7}Mn_{0.3})O_3$ | Trigonal | — |
| | R3c(161) | $BiFeO_3$ | Trigonal | — |
| | I23(197) | $Bi_{25}FeO_{40}$ | Cubic | — |

The results shown in Table 1 reveal the following.

(1) The negative electrode active material according to Example 1 has a crystal structure belonging to a space group I23, a crystal structure belonging to a space group R3c, and a crystal structure belonging to a space group R-3c. Here, it is known that $Fe_2O_3$ belonging to a space group R-3c cannot occlude or release potassium ions in the aqueous electrolyte solution (inert phase). Therefore, it is considered that, in Example 1, it became possible to occlude or release potassium ions in the aqueous electrolyte solution by at least one of the crystal structure belonging to a space group I23 and the crystal structure belonging to a space group R3c.

(2) The negative electrode active material according to Example 2 has a crystal structure belonging to a space group Pbam and a crystal structure belonging to a space group I23. It has not been confirmed whether or not these are inert phases. In other words, it is considered that, in Example 2, it became possible to occlude or release potassium ions in the aqueous electrolyte solution by at least one of the crystal structures belonging to a space group Pbam and the crystal structure belonging to a space group I23.

(3) The negative electrode active material according to Example 3 has a crystal structure belonging to a space group P21/c, a crystal structure belonging to a space group Fm-3m, and a crystal structure belonging to a space group I23. Here, it is known that $Bi_2O$ belonging to a space group P21/c and NiO belonging to a space group Fm-3m cannot occlude or release potassium ions in the aqueous electrolyte solution (inert phase). Therefore, it is considered that, in Example 3, it became possible to occlude or release potassium ions in the aqueous electrolyte solution by the crystal structure belonging to a space group I23.

(4) The negative electrode active material according to Example 4 has a crystal structure belonging to a space group I23, a crystal structure belonging to a space group R-3c, and a crystal structure belonging to a space group Fd-3m. Here, it is known that $Fe_2O_3$ belonging to a space group R-3c and $Co_3O_4$ belonging to a space group Fd-3m cannot occlude or release potassium ions in the aqueous electrolyte solution (inert phase). Therefore, it is considered that, in Example 4, it became possible to occlude or release potassium ions in the aqueous electrolyte solution by $Bi_{25}FeO_{40}$ belonging to a space group I23.

(5) The negative electrode active material according to Example 5 has two types of crystal structures belonging to a space group R3c and a crystal structure belonging to a space group I23. It has not been confirmed whether or not these are inert phases. In other words, it is considered that, in Example 5, it became possible to occlude or release potassium ions in the aqueous electrolyte solution by at least one of two types of the crystal structures belonging to a space group R3c and the crystal structure belonging to a space group I23.

In Examples 1 to 5, the crystalline phases which are common, except for the inert phase, are those belonging to a space group I23. In other words, the above results suggest that the inorganic compound having a crystal structure belonging to a space group I23 can insert or de-insert potassium ions in the aqueous electrolyte solution at a predetermined potential, and can be used as the negative electrode active material for aqueous potassium ion batteries. The validity of this suggestion was confirmed by the specific crystal structure. FIG. 2 shows one example of a crystal structure belonging to a space group I23. As shown in FIG. 2, the crystal structure belonging to a space group I23 has spaces/gaps in a part of the structure, and it is considered that potassium ions are inserted or de-inserted by intercalation through such spaces/gaps.

7. Evaluation when Type of Electrolyte was Changed

The test cell was fabricated in the same manner as in Example 5, except that the type of the aqueous electrolyte solution was changed to those shown in Table 2 below, and charge-discharge evaluation was carried out. Table 2 below shows the discharging capacity of each of test cells when the discharging capacity of the cell according to Example 5 is set at 100%.

TABLE 2

| | Electrolyte | Concentration of electrolyte in the aqueous electrolyte solution | Discharging capacity |
|---|---|---|---|
| Example 5 | $K_4P_2O_7$ | 5 mol/kg | 100% |
| Example 6 | $K_4P_2O_7$ | 2 mol/kg | 40% |
| Example 7 | $K_4P_2O_7$ | 0.5 mol/kg | 40% |
| Example 8 | $CH_3COOK$ | 28 mol/kg | 58% |
| Example 9 | $NaCF_3SO_3$ | 9.2 mol/kg | 63% |
| Example 10 | $NaCF_3SO_3$ | 1 mol/kg | 63% |
| Example 11 | LiTFSI | 21 mol/kg | 38% |
| Example 12 | $ZnSO_4$ | 2 mol/kg | 29% |

As is apparent from Table 2, the inorganic compound having a crystal structure belonging to a space group I23 is capable of inserting or de-inserting alkali metal ions such as potassium ions, sodium ions and lithium ions, and zinc ions in the aqueous electrolyte solution, and can be used as the negative electrode active material in the aqueous battery containing alkali metal ions or zinc ions as carrier ions. In particular, when the aqueous electrolyte solution contains water and alkali metal ions, especially when the aqueous electrolyte solution contains water and potassium ions, and more especially when the aqueous electrolyte solution contains water and potassium pyrophosphate dissolved in water, the capacity of the aqueous battery is increased. When the aqueous electrolyte solution contains water and potassium pyrophosphate dissolved in water, the higher the concentration of potassium pyrophosphate in the aqueous electrolyte solution, the capacity of the aqueous battery 100 increases. As far as the present inventors have confirmed, the concentration of potassium pyrophosphate in the aqueous electrolyte solution is preferably more than 2.0 mol/kg, 3.0 mol/kg or more, 4.0 mol/kg or more, or 5.0 mol/kg or more.

8. Supplementation

In the above Examples, the performance of the active material contained in the negative electrode was simply evaluated using the cell for evaluation, including a predetermined aqueous electrolyte solution, a predetermined negative electrode as the working electrode, Pt mesh as the counter electrode, and Ag/AgCl as the reference electrode. However, when actually forming an aqueous battery, for example, an appropriate positive electrode may be combined with a predetermined aqueous electrolyte solution and a predetermined negative electrode. Although no specific example is given for the positive electrode in this Example because it is not the essence of the technology of this disclosure, any known positive electrode for aqueous batteries can be employed.

9. Summary

From the above results, it can be said that an aqueous battery including a positive electrode, an aqueous electrolyte solution and a negative electrode, which satisfies the following (1) and (2), can easily improve the energy density of the aqueous battery compared to the case where an organic compound is used as the negative electrode active material, since the predetermined inorganic compound functions as the negative electrode active material.

(1) The aqueous electrolyte solution contains water and alkali metal ions or zinc ions.

(2) The negative electrode contains an inorganic compound as the negative electrode active material, and the inorganic compound has a crystal structure belonging to a space group I23.

REFERENCE SIGNS LIST

10: Positive electrode
11: Positive electrode active material layer
12: Positive electrode current collector
20: Aqueous electrolyte solution
30: Negative electrode
31: Negative electrode active material layer
32: Negative electrode current collector
40: Separator
100: Aqueous battery

The invention claimed is:

1. An aqueous battery comprising a positive electrode, an aqueous electrolyte solution and a negative electrode, wherein the aqueous electrolyte solution contains water and alkali metal ions or zinc ions, the negative electrode contains an inorganic compound as a negative electrode active material, and the inorganic compound has a crystal structure belonging to a space group I23.

2. The aqueous battery according to claim 1, wherein the inorganic compound contains element A, element M and O, the element A is at least one of Bi and La, and the element M is at least one of Bi, Mn, Fe, Co, Ti and Ni.

3. The aqueous battery according to claim 2, wherein the element A is Bi.

4. The aqueous battery according to claim 2, wherein the element M is at least one of Mn, Fe, Co and Ni.

5. The aqueous battery according to claim 2, wherein the element A is Bi, and the element M is at least one of Mn, Fe and Ni.

6. The aqueous battery according to claim 1, wherein the aqueous electrolyte solution contains water and alkali metal ions.

7. The aqueous battery according to claim 1, wherein the aqueous electrolyte solution contains water and potassium ions.

8. The aqueous battery according to claim 1, wherein the aqueous electrolyte solution contains water and potassium pyrophosphate dissolved in the water.

9. The aqueous battery according to claim 1, wherein the aqueous electrolyte solution contains water and potassium ions, a molar ratio of water to potassium ions ($H_2O/K$) is 3.5 or less, and the aqueous electrolyte solution contains potassium pyrophosphate dissolved in the water.

10. The aqueous battery according to claim 1, wherein the aqueous electrolyte solution has a pH of 3 or more and 13 or less.

11. The aqueous battery according to claim 1, wherein the aqueous electrolyte solution has no freezing point at −60° C. or higher.

12. The aqueous battery according to claim 1, wherein the aqueous electrolyte solution is not accompanied by salt precipitation when cooled from 0° ° C. to −60° ° C.

13. The aqueous battery according to claim 1, wherein the aqueous electrolyte solution has a viscosity of 10 mPa·s or more and 350 mPa·s or less at 20° C.

* * * * *